(12) United States Patent
Gligor et al.

(10) Patent No.: US 11,662,423 B2
(45) Date of Patent: May 30, 2023

(54) HOLDER FOR FIXING A SENSOR, IN PARTICULAR RADAR SENSOR, TO A VEHICLE, AND SYSTEM COMPRISING A HOLDER AND THE SENSOR

(71) Applicants: Conti Temic microelectronic GmbH, Nuremberg (DE); Continental Automotive GmbH, Hannover (DE)

(72) Inventors: Liviu Gligor, Timisoara (RO); Alexandru Lapugean, Timisoara (RO); Lars Snowdon, Lindau (DE)

(73) Assignees: Conti Temic Microelectronic GmbH; Continental Automotive GmbH

( * ) Notice: Subject to any disclaimer, the term of this patent is extended or adjusted under 35 U.S.C. 154(b) by 965 days.

(21) Appl. No.: 16/475,796

(22) PCT Filed: Jun. 15, 2018

(86) PCT No.: PCT/DE2018/200062
§ 371 (c)(1),
(2) Date: Jul. 3, 2019

(87) PCT Pub. No.: WO2018/233779
PCT Pub. Date: Dec. 27, 2018

(65) Prior Publication Data
US 2020/0264267 A1  Aug. 20, 2020

(30) Foreign Application Priority Data
Jun. 20, 2017 (AD) .............................. a 2017 00401
Jun. 20, 2017 (DE) ..................... 10 2017 210 291.8

(51) Int. Cl.
*G01S 7/02* (2006.01)
*B60R 11/00* (2006.01)
*G01S 13/931* (2020.01)

(52) U.S. Cl.
CPC ................ *G01S 7/02* (2013.01); *B60R 11/00* (2013.01); *G01S 13/931* (2013.01);
(Continued)

(58) Field of Classification Search
CPC ..................... G01S 7/02; G01S 13/931; G01S 2013/93275; G01S 7/027; B60R 11/00; B60R 2011/0047; B60R 2011/004
See application file for complete search history.

(56) References Cited

U.S. PATENT DOCUMENTS 9,487,156 B2   11/2016   Frenzel et al.
9,802,550 B2   10/2017   Kageyama et al.
(Continued)

FOREIGN PATENT DOCUMENTS

CN    106458116 A     2/2017
DE    102008050320    4/2010
(Continued)

OTHER PUBLICATIONS

Japanese Notice of Reasons for Refusal for Japanese Application No. 2019-538534, dated Mar. 3, 2022, with translation, 9 pages.
(Continued)

*Primary Examiner* — Dennis H Pedder
*Assistant Examiner* — Melissa Ann Bonifazi
(74) *Attorney, Agent, or Firm* — RatnerPrestia

(57) ABSTRACT

A holder (2) for fixing a sensor (1) to a motor vehicle includes a frame (7) and walls that bound an opening (8) for receiving and fixing the sensor. At at least two opposing walls (10, 11) each respectively have at least one clamping portion (14) for clamping the sensor (1) in place in the opening. At least two further opposing walls (12, 13) each respectively have at least one receiving portion (19, 20) for receiving a portion (6) of the sensor (1), wherein at least one
(Continued)

of the receiving portions (19) has a spring portion (18) for pretensioning the sensor (1) toward the opposing wall (12).

16 Claims, 4 Drawing Sheets

(52) U.S. Cl.
CPC . *B60R 2011/004* (2013.01); *B60R 2011/0047* (2013.01); *G01S 7/027* (2021.05); *G01S 2013/93275* (2020.01)

(56) References Cited

U.S. PATENT DOCUMENTS

| 10,449,915 | B2 | 10/2019 | Mathony et al. |
| 2004/0099775 | A1 | 5/2004 | Zheng et al. |
| 2011/0233248 | A1 | 9/2011 | Flemming et al. |

FOREIGN PATENT DOCUMENTS

| DE | 102010047273 | 6/2011 |
| DE | 102010010571 | 9/2011 |
| DE | 102012101781 | 9/2013 |
| DE | 102013009909 | 4/2014 |
| DE | 102016203406 | 9/2016 |
| EP | 3 064 402 | 9/2016 |
| EP | 3 173 290 | 5/2017 |
| EP | 3 260 725 | 12/2017 |
| JP | 2002085164 A | 3/2002 |
| JP | 2015120492 | 7/2015 |
| JP | 2016190616 A | 11/2016 |
| WO | 2016098486 A1 | 6/2016 |

OTHER PUBLICATIONS

English translation of the International Search Report of the International Searching Authority for International Application PCT/DE2018/200062, dated Oct. 11, 2018, 2 pages, European Patent Office, HV Rijswijk, Netherlands.
English translation of PCT International Preliminary Report on Patentability of the International Searching Authority for International Application PCT/DE2018/200062, dated May 20, 2019, 4 pages, International Bureau of WIPO, Geneva, Switzerland.
German Search Report for German Patent Application No. 10 2017 210 291.8, dated Jan. 25, 2018, 9 pages, German Patent and Trademark Office, Muenchen, Germany, with partial English translation, 7 pages.
Japanese Decision of Refusal for Japanese Application No. 2019-538534, dated Aug. 10, 2022, with translation, 5 pages.
Chinese Office Action for Chinese Application No. 201880009521.X, dated Oct. 20, 2022 with translation, 17 pages.

HOLDER FOR FIXING A SENSOR, IN PARTICULAR RADAR SENSOR, TO A VEHICLE, AND SYSTEM COMPRISING A HOLDER AND THE SENSOR

FIELD OF THE INVENTION

The invention relates to a holder for fixing a sensor, in particular radar sensor, to a vehicle and to a system comprising a holder and the sensor for fixing to a vehicle.

BACKGROUND OF THE INVENTION

DE 10 2010 047 273 A1 discloses a holder for fixing a sensor of an adaptive cruise control as an acquisition unit on a body-in-white structure of a vehicle. The holder in this case comprises a receptacle in the form of a recess for arranging the acquisition unit and fixing elements for fixing to the body-in-white structure. At least one second fixing element is here formed such that, in the event of impact against a pedestrian, it deforms onto the acquisition device. The second fixing element is a folded Z-shape.

These days, radar sensors are fixed by means of a holder in front of the vehicle behind a second surface. The second surface may here be part of the bumper, part of the radiator grille or part of the vehicle emblem. The holder must here ensure correct orientation of the radar sensor. In order to meet these requirements, the radar sensor must be fixed in a holder which comprises resilient elements such as catches and cup springs of plastics or metal. The holder must further comprise an interface for fixing to the vehicle. The radar sensor itself is a simple sensor without specific fixing interfaces.

The radar sensor has to be fixed in a holder since any deviation from its correct position or correct orientation results in errors and difficulties. One conventional concept for fixing the radar sensor here requires the use of additional screws for fixing the radar sensor in the associated holder. However, this complicates the radar sensor cover and entails a complex production process.

SUMMARY OF THE INVENTION

Against this background, it is an object of the present invention to provide an improved holder for fixing a radar sensor to a vehicle.

According to the invention, the above object can be achieved by a holder having the features set forth herein, and by a system comprising the holder and a sensor and having the features set forth herein, and by a vehicle having such a system with the features set forth herein.

Accordingly, a holder for a sensor is provided for fixing to a vehicle, in particular motor vehicle, comprising:

a frame with an opening for receiving and fixing the sensor, wherein at least two opposing walls of the opening in each case have at least one clamping portion for clamping the sensor in place in the opening and wherein at least two further opposing walls of the opening in each case have at least one receiving portion for receiving a portion of the sensor, wherein at least one of the receiving portions has a spring portion for pretensioning the sensor towards the opposing wall.

The concept underlying the invention consists in its being possible for the sensor to be fixed securely in the holder and held in its position without additional elements, such as for example screws, being necessary for fixing the sensor in the holder. The sensor can furthermore be fitted in the opening of the holder from two sides without requiring extensive changes to the design of the holder.

A system comprising the holder and a vehicle sensor with a sensor housing are furthermore provided, wherein the sensor housing preferably has in each case on two opposing sides at least one elongate projection to be clamped in place by a respectively associated clamping portion of the holder.

A vehicle with such a system comprising the holder and a vehicle sensor is moreover provided.

Advantageous configurations and further developments are also set forth in the description with reference to the figures of the drawings.

In one embodiment according to the invention, both the opposing walls, each of which has the at least one clamping portion, are of flexible construction, wherein, at least in a wall portion which has the respective at least one clamping portion, the respective wall is preferably flexibly suspended on the frame, wherein the wall portion is particularly preferably formed as a connecting piece which is suspended at its two ends on the frame in such a manner as to be mobile towards and away from the opposing wall. This has the advantage that the sensor can be secured between the two walls without any delicate and precision fabricated clips or the like being required for clamping. The clamping portions furthermore allow a sensor to be fixed in the opening of the frame from two sides without the flexible walls as such having to be modified for this purpose, but instead at most the clamping portion on the sensor housing of the sensor has to be adapted.

In another embodiment according to the invention, both the opposing walls, each of which has the at least one clamping portion, are formed to pretension the sensor in the installation position in the holder. This has the advantage that the sensor is firmly held in its installation position in the holder, such that it cannot unintendedly move towards one of the walls during operation and cause unwanted noise.

In a further embodiment according to the invention, the respective receiving portion is formed as an indentation, preferably with a bottom portion, for receiving a fixing and holding element, in particular a peg-like projection, as a portion of the sensor. The sensor can additionally be held downwards in its installation position by the bottom portion. In the case of the sensor being fitted from the other side of the opening of the frame, all that is optionally required is a modification of the base portion on the holder in order to fit the sensor in the holder from the other side.

According to one embodiment according to the invention, the clamping portion has a latching lug for latching or clipping to the sensor, in particular to the upper side of the sensor housing. In this manner, the sensor with its sensor housing can be held between the latching lug and the bottom portion of the indentation of the holder and the latching lug can optionally additionally pretension the sensor against the bottom portion of the respective recess of the holder.

In one embodiment according to the invention, the latching lug preferably pretensions the sensor with its sensor housing in the installation position in the holder against the bottom portion of the respective indentation. In this manner, it is additionally possible to counteract the sensor moving upwards and downwards in the holder in its installation position and thus in and out of the opening of the frame and under certain circumstances generating unwanted noise.

In a further embodiment according to the invention, the respective clamping portion has a guiding and/or centering portion for guiding and/or centering the sensor, in particular when the sensor is being introduced into the opening of the frame until it reaches its installation position. This simplifies fitting of the sensor in the holder and enables intuitive fitting by the fitter.

In one embodiment according to the invention, the respective clamping portion is formed with a wedge-shaped contour for securing and wedging the sensor in the installation position, wherein the clamping portion with its wedge-shaped contour is for example formed such that the sensor cannot move upwards and downwards in the installation position in the holder and thus in and out of the opening and furthermore not towards and away from the wall with the clamping portion. Such a wedge-shaped contour is very simple and inexpensive to produce.

According to one embodiment according to the invention, at least one wall of the opening of the holder has a receptacle, for example an indentation or slot, for receiving a coding element of the sensor. This has the advantage that the sensor cannot be unintendedly fitted incorrectly in the holder and the coding element may further be used for coding.

In one embodiment according to the invention, the holder is made at least partially or completely of plastics material.

In a further embodiment according to the invention, the holder has a vehicle interface for fixing the holder together with the installed sensor to the vehicle, for example by screw fastening, adhesive bonding and/or welding.

In one embodiment according to the invention, the opening of the frame has a right-hand wall, a left-hand wall, a front wall and a back wall, wherein the two opposing walls, each of which has the at least one clamping portion, are the right-hand and left-hand walls and the at least two further opposing walls of the opening, each of which has the at least one receiving portion for receiving a portion of the sensor, are the front and back walls, or wherein the two opposing walls, each of which has the at least one clamping portion, are the front and back walls and the at least two further opposing walls of the opening, each of which has the at least one receiving portion for receiving a portion of the sensor, are the right-hand and left-hand walls. The quadrangular opening with its four walls may for example be formed as a square opening or a rectangular opening.

According to one embodiment according to the invention, the sensor housing of the sensor to be fixed in the holder has at least one fixing and holding element on two other opposing sides, wherein the fixing and holding element is for example a peg-like projection, to be received in the associated receiving portion of the holder. In this manner just one portion, such as a fixing and holding element, is in each case received in an associated receiving portion of the holder and pretensioned by a spring portion formed on at least one of the receiving portions against the opposing wall and the receiving portion thereof and the sensor is consequently held securely in the holder.

In a further embodiment according to the invention, the sensor housing has at least one coding element to be received in the corresponding receptacle of the holder. As a consequence, incorrect fitting can be prevented and coding can further be provided.

In another embodiment according to the invention, the vehicle sensor is for example a radar sensor or another sensor which does not have its own or an additional interface for fixing to a vehicle, but is instead fixed to the vehicle via the holder according to the invention.

The above configurations and further developments may be combined with one another as desired, insofar as such combination makes sense. Further possible configurations, further developments and implementations of the invention also include combinations which are not explicitly mentioned of features of the invention as described above or hereinafter with regard to the exemplary embodiments. In particular, a person skilled in the art will also add individual aspects as improvements or additions to the respective basic form of the present invention.

BRIEF DESCRIPTION OF THE DRAWINGS

The present invention is explained in greater detail below with reference to the exemplary embodiments indicated in the schematic figures which make up the drawings, in which.

The appended drawings are intended to provide further understanding of the embodiments of the invention. They illustrate embodiments and serve in connection with the description to explain principles and concepts of the invention. Other embodiments and many of the stated advantages are revealed by the drawings. The elements of the drawings are not necessarily shown true to scale to one another.

Unless stated otherwise, identical, functionally identical and identically acting elements, features and components are in each case provided with the same reference signs in the figures of the drawings.

DETAILED DESCRIPTION OF EXEMPLARY EMBODIMENTS OF THE INVENTION

Figure 1:
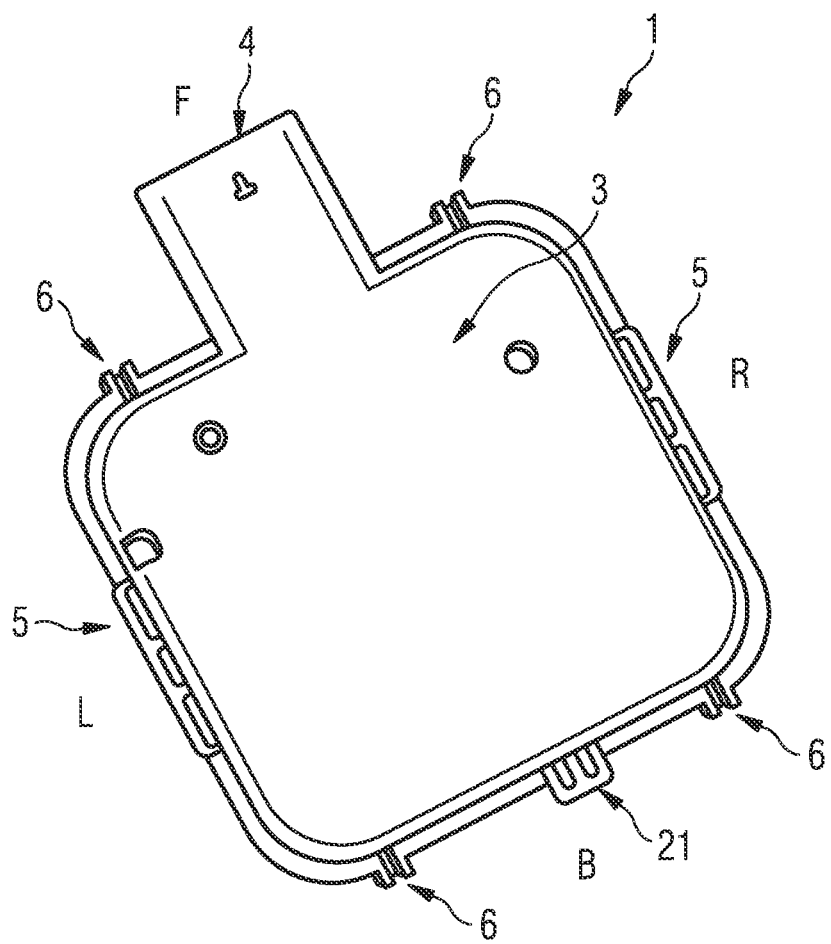
FIG. 1 shows a perspective view of a sensor which is fixable in a holder according to the invention and then fittable to a vehicle by means of the holder.
Figure 2:
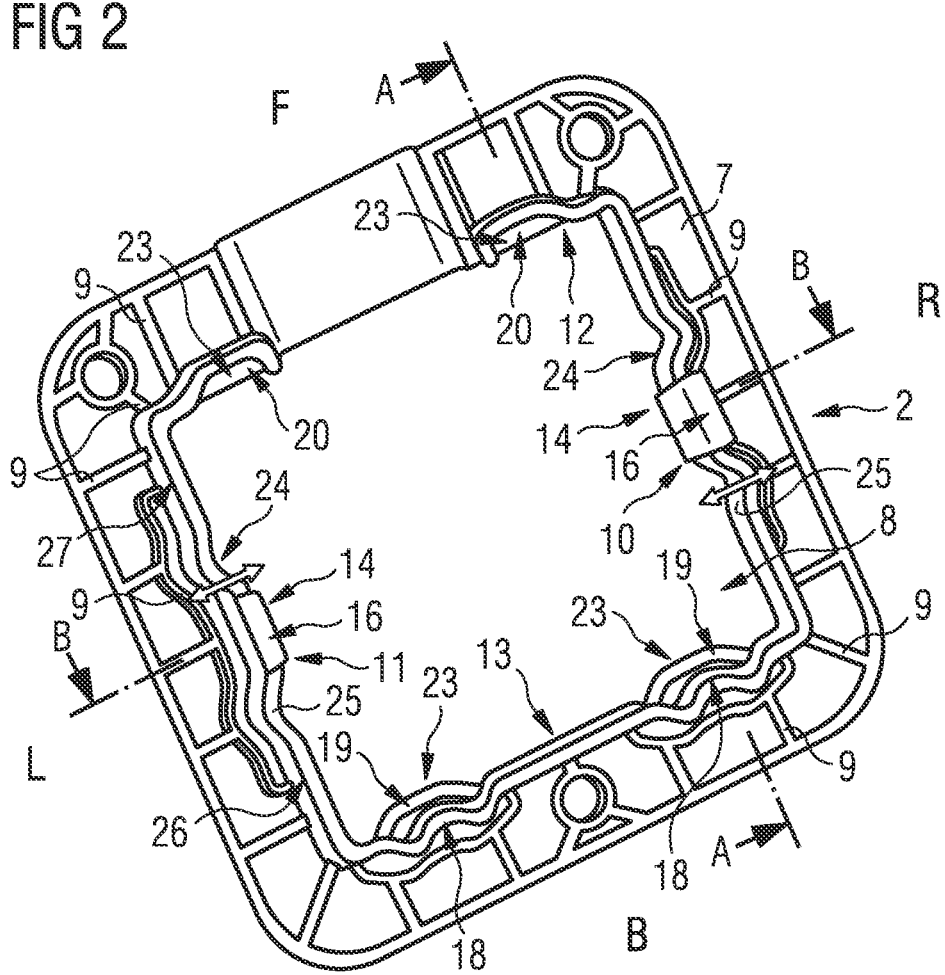
FIG. 2 shows a perspective view of the holder for fixing the sensor according to FIG. 1.
Figure 3:
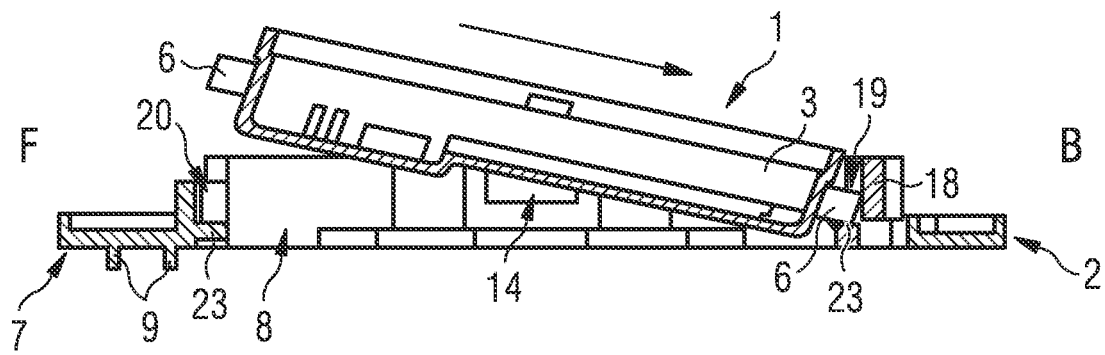
FIG. 3 shows a sectional view A-A of the holder and sensor according to FIGS. 1 and 2, wherein the sensor is introduced into the opening of the holder.
Figure 4:
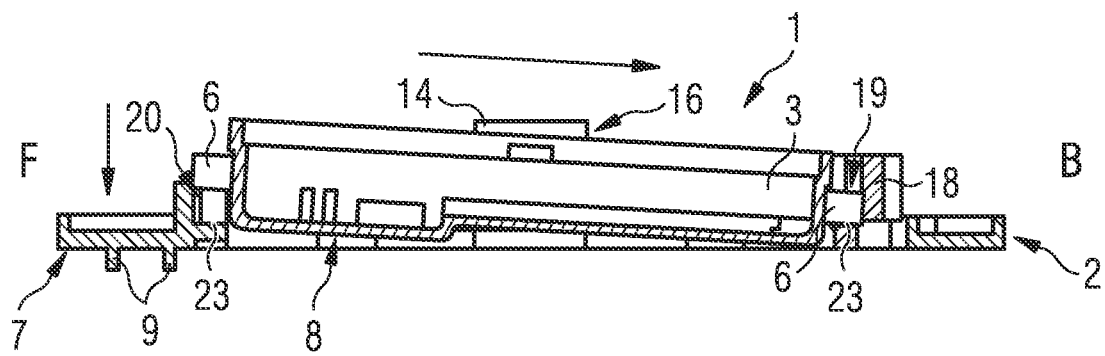
FIG. 4 shows a further sectional view A-A of the holder and sensor according to FIGS. 1 and 2, wherein the holder is further introduced into the opening of the holder.
Figure 5:
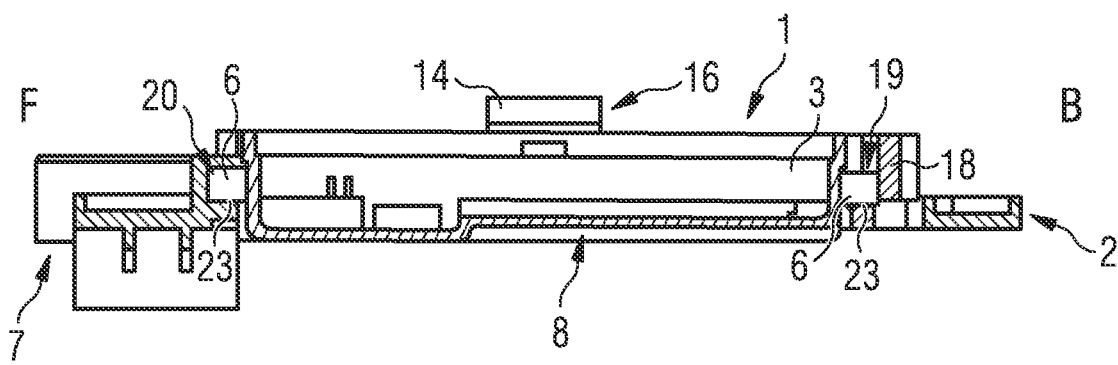
FIG. 5 shows a sectional view A-A of the holder and sensor according to FIGS. 1 and 2 in the assembled position.
Figure 6:
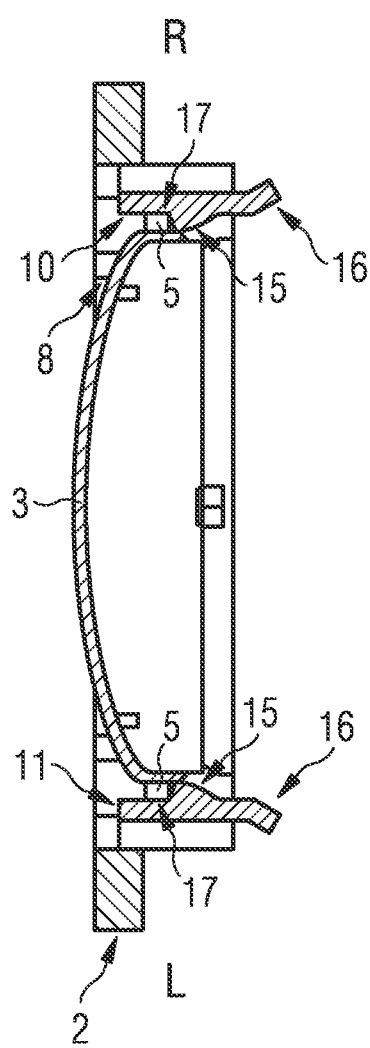
FIG. 6 shows a further sectional view B-B of the holder and sensor according to FIGS. 1 and 2 in the assembled position.

FIG. 1 shows a perspective view of a radar sensor, as an example of a sensor 1, which is fixable in a holder 2 according to the invention and then fittable to a vehicle by means of the holder 2. FIG. 2 in turn shows a perspective view of the holder 2 for fixing the sensor 1 according to FIG. 1. FIGS. 3, 4 and 5 furthermore show a sectional view A-A of the various steps of fitting of the sensor 1 according to FIG. 1 in the holder 2 according to FIG. 2. FIG. 6 shows a further sectional view B-B of the holder 2 with the sensor 1 completely fitted therein, wherein the holder 2 and sensor 1 form a system which can be fixed to an associated vehicle.

At present, radar sensors, such as for example close- or short-range radar (SRR) sensors, are fixed in two ways.

Firstly, such radar sensors are fixed to a plastics holder, to which two metal bushes are fixed by injection molding encapsulation. The plastics holder with the metal bushes is fitted, together with the radar sensor fixed to the plastics holder, to a bumper.

Secondly, radar sensors are also fixed to a smaller holder to which metal bushes have likewise been attached by injection molding encapsulation. The smaller holder with its metal bushes is then clipped, together with the radar sensor attached thereto, to a sheet metal part. The interface for the holder with the radar sensor fixed thereto is rigid. The holder with the radar sensor fixed thereto is then fixed to the vehicle by means of various methods, either by welding, adhesive bonding or by using different clips.

The holder with the radar sensor fixed thereto must ensure a precise orientation of the radar sensor on the vehicle and furthermore permit easy fitting of the radar sensor to and removal from the holder. The holder must further prevent unintended movement of the radar sensor on the interface which can otherwise result in audible noise during operation.

However, using metal bushes as additional components increases the costs and complexity of the injection mold and the holder. Development furthermore involves greater difficulty and takes longer. Production moreover requires an additional step of tightening of two screws to be screwed into the metal bushes to fix the radar sensor to the holder.

The interface between the radar sensor and the holder differs in both of the previously described fixing solutions, so resulting in a different configuration of the respective interface. Two different interfaces for the radar sensor and the respectively associated holder for fixing the radar sensor however increases development costs.

The invention therefore provides a new, simple and error-eliminating sensor fixing and removal concept.

The concept here uses the same interface for fixing the sensor 1 in two directions by using an at least partially flexible holder 2 with symmetrical fixing portions.

A combination of guide elements and the use of the body of the holder 2 as a flexible fixing device with flexible fixing portions without any additional extra components and without requiring sensitive clips which require precision molding reduces costs and the time taken for fixing.

As shown in FIG. 1, the exemplary embodiment of the sensor 1 which is shown has a sensor housing 3 with a sensor connector 4. The invention is, however, not limited to this specific configuration of the sensor and sensor connector.

The sensor housing 3 of the sensor 1 has two projections 5 on two opposing sides, here for example on the right-hand R and left-hand L sides. In the exemplary embodiment in FIG. 1, the respective projection extends along a portion of the right-hand or left-hand sides R, L of the sensor housing 3 and so forms an elongate projection 5 or side wing on the sensor housing 3.

On likewise two opposing sides, in this case for example the front F and back B of the sensor housing 3, there are in each case provided for example two front and back fixing and holding elements 6 on the sensor housing 3, for example in the form of peg-shaped projections.

The holder 2 according to the invention shown for example in FIGS. 2-6 has a peripheral frame 7 which forms an opening 8, in which the sensor 1 according to FIG. 1 is insertable and fixable. As for example shown in FIG. 2, the frame 7 may here be provided with additional reinforcing ribs 9 for at least partially increasing the stability of the frame 7.

The opening 8 of the frame 7 is defined by a right-hand wall 10, a left-hand wall 11, a front wall 12 and a back wall 13, as shown in FIG. 2.

Two clamping portions 14, which secure or clamp the sensor 1 with its sensor housing 3 with its elongate projections 5 in place therebetween, are formed on the walls of the opening 8 of the holder 1, for example the right-hand and left-hand walls 10, 11 of the opening 8 in FIG. 2, which are opposite the two elongate projections 5 of the sensor housing 3. The clamping portions 14 may here be of flexible construction or in other words the respective wall of the opening 8 with the clamping portion 14 can, at least in the region of the clamping portion 14, be of flexible or resilient construction for securing the sensor housing 3. In the exemplary embodiment shown in FIG. 2, the right-hand and left-hand walls 10, 11 are flexibly suspended on the frame 7 at least in a wall portion 24 which includes the respective clamping portion 14. The respective wall portion 24 is formed as a connecting piece 25, which is suspended at its two ends, i.e. its first and second ends 26, 27, on the frame 7, in order, as indicated with the double-headed arrow, to be able to move towards and away from the opposing wall and to clamp the sensor 1 in place in the installed state and secure it between the two wall portions 24.

The clamping portions 14 may furthermore for example alternatively additionally be of wedge-shaped construction for wedging and securing the sensor housing 3 between the clamping portions 14.

In the exemplary embodiment shown in FIGS. 2 and 6, the respective clamping portion 14 may alternatively additionally be formed with an additional latching lug 15 projecting inwardly into the opening 8, which latching lug is latched or clipped to the sensor housing 3 when the sensor 1 with its sensor housing 3 is completely installed in the opening 8 of frame 7 and is thus in its installed or final position. FIGS. 5 and 6 show the sensor 1 in its installed or final position in the holder 2.

Furthermore, as shown in the exemplary embodiment shown in FIGS. 2-6, the respective clamping portion 14 may alternatively additionally be provided with a guiding and/or centering portion 16. The guiding and/or centering portion 16 of the clamping portion 14 is formed such that it guides and preferably additionally centers the sensor 1 with its sensor housing 3 on introduction into the frame 7 and the opening 8 thereof until it is clamped in place by the clamping portions 14 and optionally latched by the latching lugs 15 which are present. The guiding and/or centering portions 16 of the clamping portions 14 are here of flexible and/or resilient construction. The guiding and/or centering portions 16 of the clamping portions 14 can additionally simplify fitting of the sensor 1 and correct positioning of the sensor 1 in the holder 2.

On insertion of the sensor 1 into the opening 8 of the frame 7, the two elongate projections 5 press the guiding and/or centering portions 16 of the clamping portions 14 outwards or apart from one another. The elongate projections 5 are then pressed between the two clamping portions 14, secured laterally by the latter and consequently clamped in position and held in the opening 8 of the frame 7. The two clamping portions 14 here have, as for example shown in the exemplary embodiment in FIG. 6, a for example above-stated wedge shape or wedge-shaped contour 17 along at least one part of the clamping portion 14 for securing and clamping the sensor 1 and its sensor housing 3 in place in the opening of the frame 7.

The additional guiding and/or centering portions 16 of the holder 2 not only serve for guiding and/or centering the sensor 1 in the holder 2 until the latter is in the correct latching or clipping position, but also serve as a rapid and simple sensor fitting and removal element.

Two spring portions 18 are for example provided on the back wall 13 of the opening 8 of the holder 2 which are formed such that, in the installed state, they press the sensor 1 against the opposing wall of the opening 8, in this case the front wall 12 in FIG. 2. More precisely, the back wall 13 has two indentations 19, in each of which is formed one of the spring portions 18. The respective spring portion 18 may here be formed as was previously the clamping portion 14 in such a manner that at least one wall portion of the back wall 13, which includes the spring portion 18 and forms the indentation 19, is flexibly suspended on the frame 7. The respective wall portion of the back wall 13 here for example is formed as a connecting piece which is suspended at its two ends, i.e. its first and second ends, on the frame 7 and furthermore forms the indentation 19. The connecting piece can move towards and away from the opposing wall, in this case the front wall 12, in order to press or pretension the sensor 1 in the installed state towards the front wall 12.

The front wall 12 likewise has two indentations 20. The indentations 20, 19 of the front wall 12 and the back wall 13 here receive the above-stated fixing and holding elements 6 of the sensor housing 3 in the form of for example peg-shaped projections. The spring portion 18 in the respective indentation 19 of the back wall 13 of the holder 2 then presses the sensor housing 3 with its fixing and holding portions 6 towards and against the front wall 12, for example a firm or less flexible front wall 12. In this manner, the sensor is pretensioned in the installed state by the holder, as previously described, and prevented from unintended movement towards the front wall and away from the front wall. The front and/or back indentations 20, 19 in each case alternatively additionally have a bottom portion 23. The sensor housing 3 with its fixing and holding elements 6 received in the indentations 19, 20 may be pretensioned against the bottom portions 23 in the indentations by the clamping portions 14 and in particular optionally additionally present latching lugs in order to provide a pretensioning force which prevents unintended upwards and downwards movement of the sensor 1 in the installed state in the opening 8 of the holder 2.

In order to fix the sensor 1 with its sensor housing 3 to the holder 2, the sensor housing 3, as shown in FIG. 3, is firstly brought into contact with one wall of the opening 8 of the holder 2, for example the back wall 13 in the exemplary embodiment in FIG. 3. More precisely, the sensor housing 3 is brought into contact with the back wall 13 of the opening 8 of the holder 2 until the two fixing and holding elements 6 of the sensor housing 3 in the form of for example peg-shaped projections are received in the indentations 19 in the back wall 13 and come into contact with the spring portions 18 in the indentations 19. On introduction into the opening 8 of the holder 2, the sensor 1 is furthermore guided and/or centered by the optionally present guiding or centering portions 16 of the clamping portions 14.

In the exemplary embodiment shown in FIG. 1, the sensor housing 3 alternatively additionally has a coding element on its back B, for example a coding projection 21 in FIG. 1, which is formed such that the sensor housing 3 cannot be incorrectly installed in the holder 2. In the exemplary embodiment in FIG. 1, the coding projection 21 is received in a receptacle 22, for example a slot or indentation, on the back wall 13 of the opening 8 of the holder 2. As a consequence, the sensor housing 3 cannot be incorrectly installed in the holder 2, since a fitter will immediately notice if he/she has incorrectly introduced the sensor housing 3, since the coding projection 21 then cannot be received in the associated receptacle 22, for example the slot or indentation, and further insertion of the sensor housing 3 into the opening 8 of the holder 2 is consequently prevented.

If, in contrast, the fitter has correctly introduced the sensor 1 with the back wall 13 of the sensor housing 3 into the opening 8 of the holder 2 and, in so doing, introduced the optionally present additional coding projection 21 into the receptacle 22 in the associated wall of the holder 2, the fitter then also presses the front F of the sensor 1 into the opening 8 of the holder 2, as shown in FIG. 4. The sensor 1 is here received with its two back fixing and holding elements 6 in the form of for example peg-shaped projections in the indentations 19 in the back wall 13, wherein said elements come into contact with the spring portions 16 in these indentations 19. The sensor 1 is consequently pressed against the front wall 13 and the front fixing and holding elements 6 of the sensor housing 2 in the associated indentations 20 in the front wall 12.

The optionally present guiding or centering portions 16 of the clamping portions 14 help to orient the sensor 1 and its sensor housing 3 in the holder 2, while they simultaneously permit the sensor 1 to slide easily and uniformly until it snaps or latches into the desired position or its end position in the opening 8 of the holder 2.

The sectional view A-A in FIG. 5 and the sectional view B-B in FIG. 6 show the sensor 1 with its sensor housing 3 in its end position or installation position in the holder 2.

In this state, the spring portions 18 in the indentations 19 on the back wall 13 of the holder 2 press the sensor 1 with its sensor housing 3 and the front two fixing and holding elements 6 in the form of for example peg-shaped projections forwards and against the front wall 13 of the holder 2. The pretensioning force provided in this manner prevents unintended forwards and backwards movement of the sensor 1 in the holder 2 or the previously described movement of the sensor towards the front wall 13 and away from the front wall 13 of the opening 8.

As shown in the sectional view B-B in FIG. 6, the two elongate projections 5 or side wings on the right-hand and left-hand sides R, L of the sensor housing 3 in turn interact with the clamping portions 14 on the right-hand and left-hand walls 10, 11 of the opening 8 of the holder 2. The sensor 1 with its sensor housing 3 is consequently secured and wedged by the clamping portions 14 in the holder 2, such that the sensor 1 is held both downwards and from the sides, i.e. by its right-hand and left-hand sides R, L, by the clamping portions 14. This pretensioning force generated by the clamping portions 14 on the sensor towards the right-hand and left-hand walls 10, 11 of the opening 8 of the holder 2 blocks unintended lateral movement, i.e. unintended movement of the sensor and to the right and left, and unintended upwards and downwards movement of the sensor 1 in the holder 2.

In particular, the additional latching lug 15 of the clamping portion 14 and optionally the wedge shape of the respective clamping portion 14 ensures that the sensor housing 3 with its respective fixing and holding portions 6 is pressed and alternatively additionally pretensioned against a bottom portion 23 of the respectively associated indentation 19 or 20. The previously mentioned unintended upwards and downwards movement of the sensor housing 3 can be prevented in this manner.

In this way, the holder 2 holds the sensor 1 firmly in all directions and leaves no latitude for unintended movement of the sensor in the holder 2. Moreover, pretensioning forces in all spatial directions prevent any unwanted audible noise from arising during operation of the sensor 1. Furthermore, elements such as the spring portions 16 and clamping portions 14 etc. can compensate tolerance differences arising for example from different materials.

The holder with the radar sensor fixed thereto preferably has a vehicle interface for fixing the holder to the vehicle for example by welding, adhesive bonding, screw fastening etc.

The principal advantage of the invention is that, in the installed state, the sensor 1 can be pretensioned by the holder 2 in a plurality of and preferably all directions. This permits firm seating of the sensor 1 in the holder 2 without there being any need for sensitive, resilient members of the holder which entail high precision production to be provided as clips.

Furthermore, there is no need for any further elements, such as for example metal springs or screws, which have to be preassembled or produced. Moreover, there is no need for additional metal elements, such as bushes, which have to be injection-molded, so reducing costs and the time required for production development.

A further advantage of the invention is that fitting and removal of the sensor 1 in the holder 2 is very simple and highly intuitive for a fitter.

The sensor 1 can furthermore be fitted in two directions, both pointing downwards and upwards, without there being any need even to slightly modify the shape of the holder 2 for different circumstances or initial situations.

The interface between holder 2 and the sensor 1 fixed thereto and a vehicle is flexible with regard to sizing, such that, when it comes to implementing the sensor 1 and its sensor housing 3, the size and weight of the sensor 1 and its sensor housing 3 can be flexibly selected.

This interface between holder 2 and vehicle may be used for different fixing areas. For example, the interface can be used to fix the sensor 1 in the holder 2, wherein the holder 2 itself can be fixed, for example with screws, by adhesive bonding and/or by welding, to the vehicle, for example a vehicle bumper or another comparable vehicle component.

The present invention has been explained by way of example using a radar sensor which does not have its own or an additional fixing interface for fixing to a vehicle. Instead, the radar sensor is fixed in a holder with which it is then fixed to the vehicle. The invention is, however, not limited to a radar sensor but may instead be applied to any vehicle sensor which does not have its own or an additional interface for fixing to a vehicle but is instead fixed to the vehicle via the holder according to the invention.

Although the present invention has been fully described above on the basis of preferred exemplary embodiments, it is not limited thereto but may instead be modified in many and varied ways. The various embodiments, in particular individual features thereof, may here be combined with one another.

REFERENCE SIGNS

1 Sensor
2 Holder
3 Sensor housing
4 Sensor connector
5 Elongate projection
6 Fixing and holding element
7 Frame
8 Opening
9 Reinforcing rib
10 Right-hand wall
11 Left-hand wall
12 Front wall
13 Back wall
14 Clamping portion
15 Latching lug
16 Guiding and/or centering portion
17 Wedge-shaped contour
18 Spring portion
19 Indentation (with spring portion)
20 Indentation
21 Coding projection
22 Receptacle
23 Bottom portion (indentation)
24 Wall portion
25 Connecting piece
26 First end of the connecting piece
27 Second end of the connecting piece

The invention claimed is:

1. A holder for fixing a sensor to a motor vehicle, comprising a frame that surrounds an opening, as well as opposing first and second walls and opposing third and fourth walls that bound the opening, configured to receive and fix the sensor in the opening,
wherein the opposing first and second walls each respectively have at least one clamping portion configured to clamp the sensor in place in the opening,
wherein the opposing third and fourth walls each respectively have at least one receiving portion configured to receive a portion of the sensor,
wherein the receiving portion of the fourth wall comprises a spring portion configured to pretension the sensor toward the opposing third wall, and
wherein each respective clamping portion respectively comprises a latching lug configured to latch or clip onto the sensor.

2. The holder according to claim 1, wherein the opposing first and second walls are configured to pretension the sensor in an installation position in the holder.

3. The holder according to claim 1, wherein the respective receiving portion is respectively an indentation, preferably with a bottom portion, configured to receive a fixing and holding element, in particular a peg-like projection, of the sensor.

4. The holder according to claim 3, wherein the latching lug is preferably configured to pretension the sensor in an installation position against the bottom portion of the indentation.

5. The holder according to claim 1, wherein the respective clamping portion comprises a guiding and/or centering portion configured to guide and/or center the sensor.

6. The holder according to claim 1, wherein the respective clamping portion comprises a wedge-shaped contour configured to secure and wedge the sensor in an installation position, wherein the respective clamping portion with the wedge-shaped contour thereof is preferably configured so that the sensor cannot move upward and downward in the installation position in the holder and cannot move toward and away from the respective first or second wall having the respective clamping portion.

7. The holder according to claim 1, wherein at least one of the walls has a receptacle, in particular an indentation or slot, configured to receive a coding element of the sensor.

8. The holder according to claim 1, wherein the holder is made of a plastic material.

9. The holder according to claim 1, further comprising a vehicle interface configured to fix the holder to the vehicle, in particular by screw fastening, adhesive bonding and/or welding.

10. The holder according to claim 1,
wherein the first wall is a right-side wall, the second wall is a left-side wall, the third wall is a front wall and the fourth wall is a back wall, or
wherein the first wall is a front wall, the second wall is a back wall, the third wall is a right-side wall, and the fourth wall is a left-side wall.

11. A system comprising the holder according to claim 1 and a vehicle sensor with a sensor housing, wherein the sensor housing preferably has respectively on each of two opposing sides thereof at least one elongate projection configured to be clamped in place by a respectively associated one of the clamping portions of the holder.

12. The system according to claim 11, wherein the sensor housing further has at least one fixing and holding element on two other opposing sides of the sensor housing, wherein the fixing and holding element is in particular a peg-like projection configured to be received in a respectively associated one of the receiving portions of the holder.

13. The system according to claim 11, wherein at least one of the walls of the holder respectively has a receptacle, and wherein the sensor housing has at least one coding element configured to be received respectively in the receptacle.

14. The system according to claim 11, wherein the vehicle sensor is a radar sensor.

15. A vehicle comprising a vehicle body and the system according to claim 11.

16. A holder for fixing a sensor to a motor vehicle,
comprising a frame that surrounds an opening, as well as opposing first and second walls and opposing third and fourth walls that bound the opening, configured to receive and fix the sensor in the opening,
wherein the opposing first and second walls each respectively have at least one clamping portion configured to clamp the sensor in place in the opening,
wherein the opposing third and fourth walls each respectively have at least one receiving portion configured to receive a portion of the sensor,
wherein the receiving portion of the fourth wall comprises a spring portion configured to pretension the sensor toward the opposing third wall,
wherein each respective clamping portion respectively comprises a latching lug configured to latch or clip onto the sensor,
wherein the opposing first and second walls are of a flexible construction,
wherein the respective first or second wall is preferably flexibly suspended on the frame at least via a respective wall portion thereof which comprises the respective at least one clamping portion, and
wherein the respective wall portion is particularly preferably formed as a connecting piece which is suspended at two ends thereof on the frame so as to be movable toward and away from the respective opposing second or first wall.

\* \* \* \* \*